Dec. 23, 1924.  1,520,156
A. W. STARCK
SPRING FRAME FOR SADDLES FOR BICYCLES, MOTOR CYCLES, AND THE LIKE
Filed Sept. 5, 1923
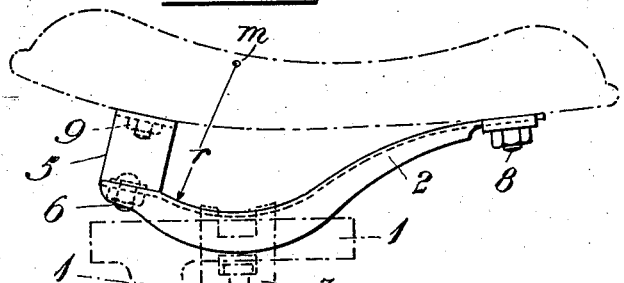
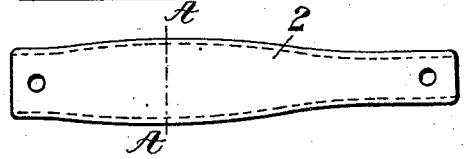
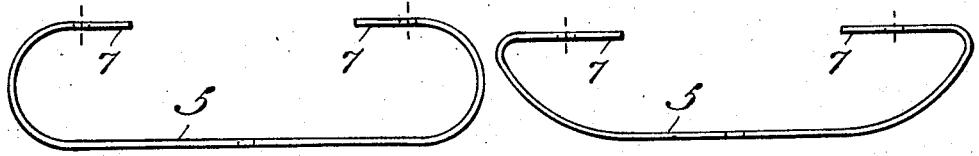
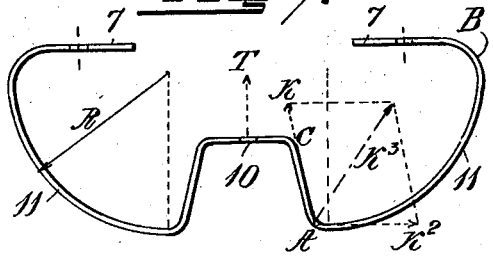

Patented Dec. 23, 1924.

1,520,156

UNITED STATES PATENT OFFICE.

AUGUST WILHELM STARCK, OF SKOVDE, SWEDEN.

SPRING FRAME FOR SADDLES FOR BICYCLES, MOTOR CYCLES, AND THE LIKE.

Application filed September 5, 1923. Serial No. 660,998.

*To all whom it may concern:*

Be it known that I, AUGUST WILHELM STARCK, subject of the King of Sweden, residing at Skovde, Sweden, have invented certain new and useful Improvements in Spring Frames for Saddles for Bicycles, Motor Cycles, and the like; and I do hereby declare the following to be a full, clear, and exact description of the invention, such as will enable others skilled in the art to which it appertains to make and use the same.

This invention relates to saddles for bicycles, motorcycles and the like and it relates more particularly to the construction of spring frames for such saddles, the object of the invention being to provide a spring frame of improved construction.

According to this invention, the saddle is provided with a main spring which extends longitudinally of the saddle, this spring being made with a curved or arched cross-section throughout substantially its entire length and the length and shape of the cross-section being variable in a lengthwise direction of the spring. This peculiar shape of the main spring makes it possible to reduce its weight materially (for example, to about 70 gms.) without affecting detrimentally the strength and elasticity of the spring. On the contrary, a spring constructed in this manner is easily flexed and provides a relatively great amount of comfort to the rider; yet without any danger of breaking will sustain the weight of the heaviest rider with a large factor of safety. Moreover, saddle springs may be advantageously made in the manner just described from relatively inexpensive material such as hoop steel.

It is advantageous to provide, in connection with the main spring just described, a second or back spring arranged at the rear end of the main spring and extending transversely across the saddle. This spring is preferably made in the shape of a reclining C, the opening of which is turned upwardly and the lower central part of which is preferably formed in the shape of an inverted U. This upwardly extending inverted U shaped portion of the back spring rests upon the rear end of the main spring and the free ends of the back spring are secured to the saddle.

Through this combination of the main spring and the rear spring, a spring frame is formed which answers all requirements in regard to vertical and lateral elasticity, ruggedness of construction, efficient use of material, and low cost of production.

For the purpose of illustrating the invention the following drawings show as example one embodiment of same.

Fig. 1 is a side elevation of a saddle provided with a spring frame according to this invention.

Fig. 2 shows the main spring of the spring frame (the one arranged lengthwise of the cycle frame).

Fig. 3 is a cross section of the main spring along the line A—A in Fig. 2.

Figs. 4, 5, 6 and 7 show side views of different embodiments of a spring belonging to the spring frame and being fixed to the rear part of the main spring in a transverse direction of the frame carrying the rear part of the saddle or seat, and here below called the back spring.

In the drawings 1 is the saddle pin, 2 is the main spring of the spring frame arranged longitudinally of the bicycle frame and fixed to the saddle pin by means of a clamp 3 suitable for the purpose provided with a set screw 4 or similar device for fixing the spring to the pin. 5 is the back spring fixed to the rear part of the main spring 2 transversally of the frame. This back spring can be made according to any of the forms shown in Figs. 4, 5, 6, or 7. It is fixed to the main spring 2 by means of a screw 6 provided with a nut. The saddle at its front end rests on the front part of the spring 2 and at its rear end rests upon the ends 7 of the spring 5 and is, as shown in Fig. 1, fixed to said springs by means of bolts 8, 9 or similar suitable arrangements. The main spring 2 is preferably curved lengthwise along that part, which is to rest against the pin 1, for instance bent to a circular line with the line $r$ as a radius and with the point $m$ located directly above the clamp 3 as a centre for the purpose of making it possible to adjust the saddle at different inclinations in the lengthwise direction of the frame. The spring 2 is preferably made with a curved cross section as shown in Fig. 3 with the cross section or length of arch decreasing towards the ends as shown in Fig. 1. Thereby a very easy mounting of the spring to the saddle pin or frame is obtained, as generally this frame is made of pipes or similar members of uniform cross section.

In addition the moment of inertia of the spring is thereby increased so it will be possible to use very thin material in the spring. By varying the length of the arch of the cross section it is possible to obtain the desired strength and stiffness at different parts of the spring and decrease the weight of the spring and give it an elegant and tasteful appearance. The back spring can, as stated above, have different forms, so that the spring can receive a different degree of stiffness for different loads with the same thickness of material. The embodiments shown in Figs. 4 and 5 have chiefly the form of a capital C lying with the gap upwards while the opposite continuous part which can be straight or more or less curved is turned downwards and rests upon the rear part of the main spring 2. The embodiment shown in Fig. 5 differs from that shown in Fig. 4 principally in that the curves at the ends of the spring are more pointed. According to the embodiment in Fig. 6 the form of the spring has been changed principally to a U-form with the end parts 7, upon which the saddle rests, bent outwards. The form of the back spring shown in Fig. 4 is for instance suitable for a pliable spring, the one shown in Fig. 5 for a spring of normal stiffness, and the one shown in Fig. 6 for stiff springs.

The embodiment of back springs shown in Fig. 7, which is especially preferred for this purpose has also the fundamental form of a reclining C, but the middle part 10 of the lower part is raised, so that this part, which rests upon the rear part of the main spring, principally has the form of a reversed U, while the end parts 11 of the spring thereby receive a more or less sharp curvature, so that the end parts 11 each receive principally the form of a more or less curved C.

Owing to this peculiar shape of the rear spring there will be such a distribution of energy, if loaded, that the bending moment of arc A—B is gradually reduced in the course of bending downward, i. e., the resisting power of the spring is automatically increased in the ratio of the increase of the load. The force of compression T is transmitted to arc A, B by means of the forces K which act on the semi-stiff arms or the parts A C, but, in the act of bending downward, arc A B endeavors to bend arm A C, which produces the horizontal force $K^2$. The impression made on arc A B by forces K and $K^2$ will be identical to the impression made on the same arc by resultant $K^3$, but in the ratio at which the downward bend increases arm A C will be bent more towards the vertical position, and horizontal force $K^2$ will be increased. The result will be that the resultant $K^2$ will more and more approach the horizontal plane, i. e., the lever will become smaller and arc A B increases in stiffness.

It is of course possible, if desired, to use two or more back springs instead of one. As understood from the above the springs according to the present invention are manufactured from flat steel instead of steel wire.

Among the advantages gained through the present invention as compared to previously used spring frames for the same purpose the following are to be observed:

1. Suitability for standardizing and production in large quantities.

2. Possibility to form the material so that the moments of inertia in the different sections of the construction correspond as close as possible to the respective bending moments, whereby it is possible to reduce the weight of the spring frame to one-fourth of the weight of others.

3. Possibility to form the material in the cold state without overstraining it in any part as is the case in the production of spring frames of wire. Cassations of materials need therefore not occur.

4. Possibility to use common material of suitable carbon content such as hoop steel, thus of no special quality, as is necessary for spring frames of wire.

5. The different springs can be entirely manufactured in machines. Hand work is thus eliminated, a circumstance effecting a very much lower cost of production of these spring frames than of such of wire. When further no cassations need occur and the weight can be lessened with as much as 75% the consequence is that spring frames according to the present construction become much cheaper than spring frames of wire.

Having thus described my invention I declare that what I claim is:

1. In a saddle for bicycles, motorcycles and the like, a seat member, and a longitudinally disposed spring for supporting such seat member, such spring being arched in cross-section throughout its length, the concave side of the spring being directed downward, and the length of cross-sectional arch varying throughout the length of the spring.

2. In a saddle for bicycles, motorcycles and the like, a seat member, and a longitudinally disposed spring for supporting such seat member, said spring having a curved cross-section throughout its length, the concave side of the spring being directed downward and said cross-section being variable in length and shape throughout the length of the spring.

3. In a saddle for bicycles, motorcycles and the like, a seat member, and a longitudinally disposed spring for supporting such seat member, said spring being arched in cross-section throughout its length, the concave side of the spring being directed downward, and the length of said cross-sectional arch decreasing toward the ends of the spring.

4. In a saddle for bicycles, motorcycles and the like, a seat member, a longitudinally disposed main spring secured to the seat member near the front thereof and a back spring of substantially reclining C shape, having its opening turned upwardly and disposed substantially at right angles to said main spring, the free ends of the back spring being secured to the seat member and the central part of said back spring being formed in the shape of an inverted U and rigidly secured to the rear end of the main spring.

In testimony whereof I affix my signature.

AUGUST WILHELM STARCK.

Witnesses:
 EMIL GUNGNIMP,
 L. OLSON.